March 26, 1929.    D. F. GOOD    1,707,119
BELT TIGHTENER FOR SAW MILL FEED MECHANISM
Filed April 20, 1927    2 Sheets-Sheet 1
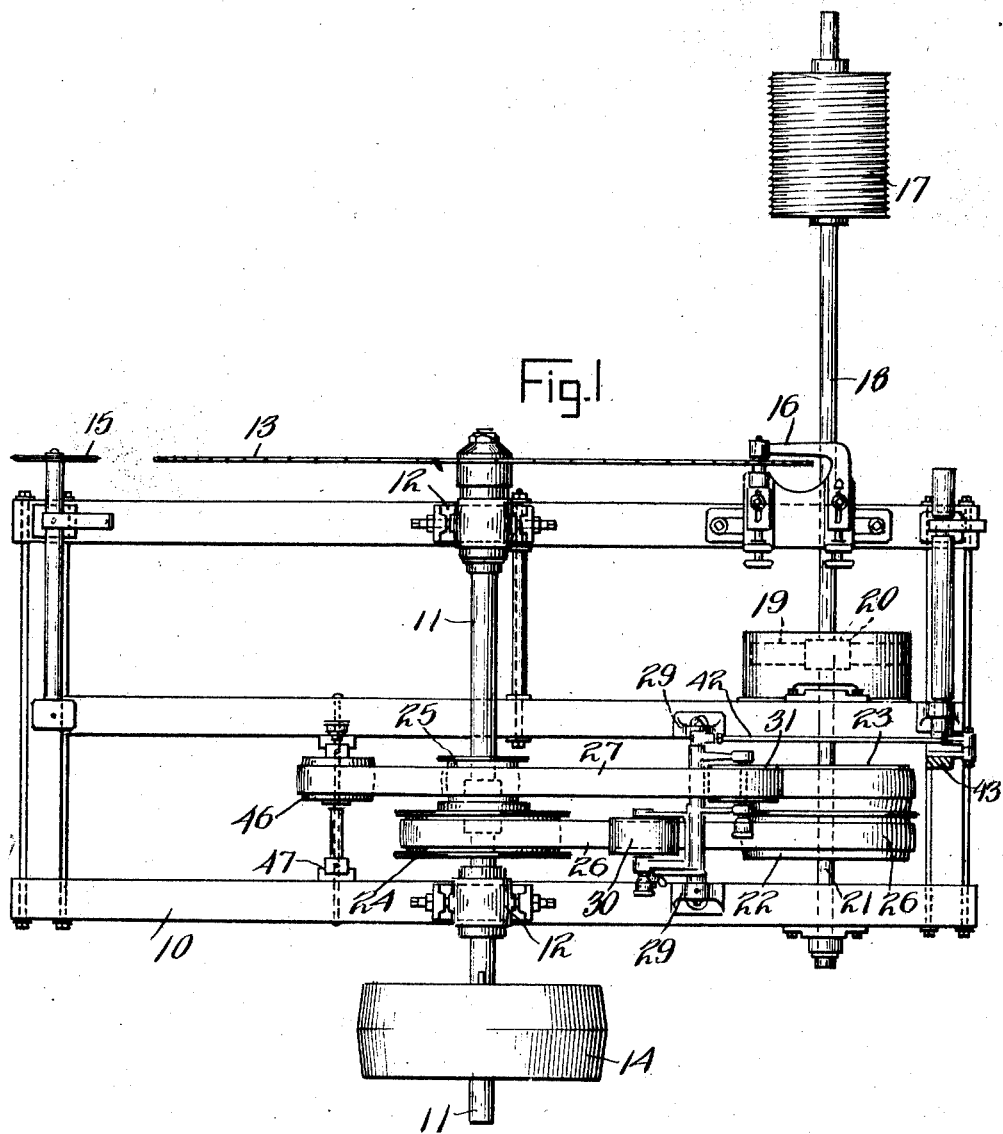
Inventor
Daniel F. Good
By
Attorney March 26, 1929.  D. F. GOOD  1,707,119
BELT TIGHTENER FOR SAW MILL FEED MECHANISM
Filed April 20, 1927  2 Sheets-Sheet 2
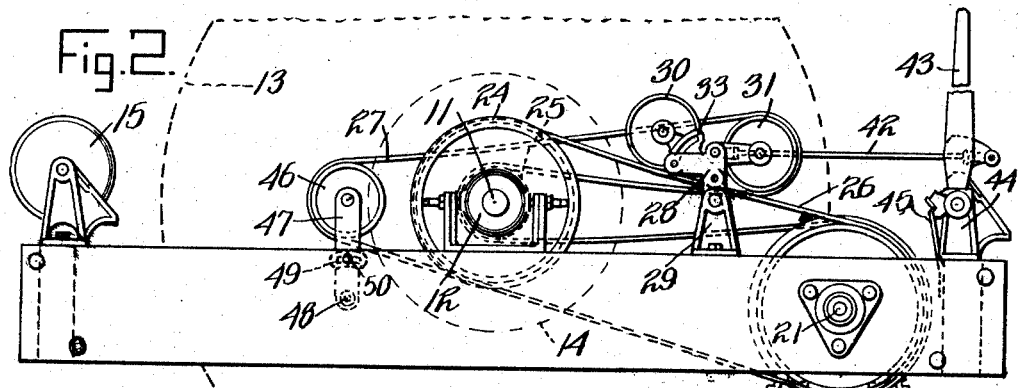
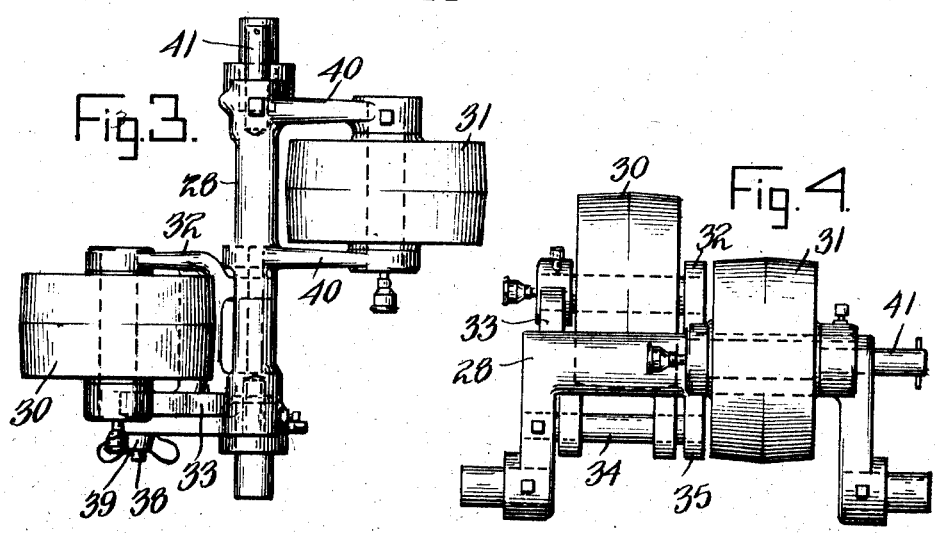
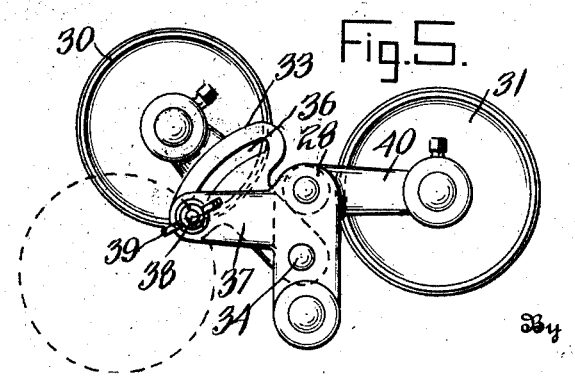
Inventor
Daniel F. Good
By
Attorney Patented Mar. 26, 1929.

1,707,119

UNITED STATES PATENT OFFICE.

DANIEL F. GOOD, OF WAYNESBORO, PENNSYLVANIA, ASSIGNOR TO FRICK COMPANY, OF WAYNESBORO, PENNSYLVANIA, A CORPORATION.

BELT TIGHTENER FOR SAWMILL FEED MECHANISM.

Application filed April 20, 1927. Serial No. 185,237.

My invention relates to a belt tightener for a saw mill feed mechanism wherein the saw shaft and pulleys fixed thereon rotate at a constant rate of speed within belts adapted to be alternately drawn taut for feeding the work carriage or gig toward the saw and reversing such feeding operation.

It is an object of the invention to provide improved mechanism for tightening or rendering the belts taut which possesses a greater degree of adjustability than others previously in use and one in which a more flexible feeding mechanism is provided by means of which expansion and contraction of the belts may be accommodated without cutting and shortening the same, all as will be hereinafter more particularly described and claimed.

In the drawings, which are made a part hereof and in which like reference characters indicate like parts:

Figure 1 is a top plan view illustrating one application of my invention,

Figure 2, a side elevation,

Figure 3, a top plan view of one form of belt tightening mechanism,

Figure 4, a rear elevation of such belt tightening mechanism, and

Figure 5, a side elevation of the same.

In the drawings, reference character 10 indicates a stationary frame comprising a pair of longitudinal side members, a pair of end members and an intermediate longitudinal member, all of which may be secured together by bolts or any other desired means. A shaft or mandrel 11 is mounted in brackets 12 on the frame 10 substantially at the center and transversely of the same. The shaft 11 is provided at one end with a saw 13 and at its opposite end with a pulley 14 by means of which the shaft and saw are rotated. The material to be cut is fed from the right toward the left in Fig. 1, where it is cut by the saw and a kerf spreader 15 is provided rearwardly of the saw or at the left of Fig. 1 for performing a well-known function. At the right of Fig. 1, or forwardly of the saw, is provided an aligning or truing device 16. A carriage and ways, not shown, are disposed beside the frame 10 and the carriage is moved longitudinally in one direction for feeding logs or the like into the saw and in the opposite direction for returning the carriage. The carriage is moved by means of power transmitted from the saw shaft to a drum 17 about which is wound a cable connected to said carriage.

The drum 17 is mounted upon a shaft 18 supported in bearings on the under side of the frame and such shaft is provided with a gear 19 which cooperates with a gear 20 of a considerably smaller relative size fixed on a shaft 21 mounted in parallel relation to the shaft 18. The shaft 21 is provided with a pair of pulleys 22 and 23, of substantially equal size, and a pair of pulleys 24 and 25 are fixed on the shaft 11 in opposed relation thereto. The pulley 24 is of substantially the same size as the pulley 22 and is adapted to drive the pulley 22 at an equal speed by means of a belt 26, which is disposed around the pulleys 22 and 24. The pulley 25 is substantially one-half the size of the pulley 23 and is adapted by means of belt 27 to drive the pulley 23 at a reduced speed.

A yoke 28 is pivotally mounted in brackets 29 transversely of the frame and in parallel relation to the shafts 11 and 21 between the pulleys 22, 23 and 24, 25. Said yoke is provided with a pair of pulleys 30 and 31 which are adapted to be moved respectively into engagement with the belts 26 and 27 for causing said belts to become taut for driving the shaft 21 in a forward or reverse direction for reciprocating the carriage. Said pulleys 30 and 31 are disposed in substantially a plane formed by the pulleys 22, 23 and 24. The pulley 30 is supported on the yoke 28 by means of arms 32 and 33 pivotally mounted on a shaft 34 having one end journalled in one side of the yoke 28 and having its opposite end supported in a lug 35 formed integrally with the yoke 28, substantially intermediate the arms of such yoke. By this construction the pulley 30 may swing through a considerable arc about the shaft 34, upon which it is supported. In order to secure the pulley in a definite fixed position, I provide the arm 33 with a slot 36 of arcuate shape and provide a lateral boss or lug 37 formed integrally with the yoke 28 with a bolt 38 disposed in the end of the same and in the slot 36 adapted to be fastened in position by a wing nut 39. The pulley 31 is mounted on the opposite side of the yoke 28 upon a shaft journalled in a pair of laterally and forwardly extending arms 40 formed integrally with the yoke 28.

The yoke 28 is provided with a crank pin 41 to which is attached a connecting rod 42 adjustably connected with an operating lever 43 pivotally supported by a bracket 44. The operating lever 43 is held in neutral position by means of a spring 45, which engages a notch in the lever adjacent its lower end. On the opposite side of the shaft 11 from pulleys 23 and 31 a pulley 46 is mounted in brackets 47 pivoted at 48 upon the frame 10, said brackets 47 being provided with arcuate slots 49 in which are disposed screws 50 for holding the brackets in proper adjusted position. This construction permits the pulley 46 to be swung longitudinally of the frame toward and away from the pulley 25, opposite which it is disposed. The belt 27 extends around the pulley 25 by means of which it is driven, around and over the pulley 31, and about the pulleys 46 and 23.

When the parts are in the position shown in Figure 2, the belts 26 and 27 are loose and the pulleys 24 and 25 rotate freely within said belts. The movement of the operating lever 43 to the right causes the pulley 31 to draw the belt 27 into engagement with the pulley 25 in proportion to the amount the lever is operated, whereupon considerable friction between the belt and the pulley is caused and the feeding mechanism moves toward the saw in a manner controlled entirely by the slipping of the belt up to the full speed of the feed which, of course, depends upon the size of the log being cut. A movement of the lever beyond the neutral position in a reverse direction releases the belt 27 and causes the pulley 30 to press downwardly upon the belt 26 and draw the same taut, whereupon friction between the pulley 24 and the belt drives the belt and the pulley 26 and carriage in the reverse direction at a greatly increased speed.

The structure I have shown permits the adjustment of the feed belt 27 or the reverse belt 26 to the extent of several inches to take care of expansion and contraction without cutting either belt or without increasing the length of movement of the operating lever 43. However, the lever and the connecting rod may be adjusted to further increase the flexibility of the feeder.

It will be obvious to those skilled in the art that various changes may be made in my device without departing from the spirit of my invention, and I, therefore do not limit myself to what is shown in the drawings and described in the specification, but only as set forth in the appended claim.

Having thus fully described my said invention, what I claim as new and desire to secure by Letters Patent, is:

A belt tightener for saw mill feed mechanism comprising supporting means, a yoke including a rod-like body having parallel legs engaging said supporting means, a pair of arms extending laterally from one side of said rod-like body, a pulley journalled between the outer ends of said arms, a short leg mounted on said body between the legs of the yoke, a shaft having one end supported in said short leg and having its other end supported in one of the legs of the yoke, a pair of arms pivoted on said shaft and extending laterally on the opposite side of the yoke from the first-mentioned arms, one of said pivoted arms having a curved slot, a pulley journalled between said arms, and a fastening element carried by one of the legs of the yoke for cooperation with said curved slot for permitting adjustment of the pulley about the shaft supported in the legs of the yoke and rotatable with the yoke about its support, substantially as set forth.

In witness whereof, I have hereunto set my hand at Waynesboro, Pennsylvania this fifteenth day of April, A. D. nineteen hundred and twenty-seven.

DANIEL F. GOOD.